United States Patent [19]

Oda et al.

[11] 4,299,682
[45] Nov. 10, 1981

[54] GAS DIFFUSION ELECTRODE

[75] Inventors: Yoshio Oda; Takeshi Morimoto; Kohji Suzuki, all of Yokohama, Japan

[73] Assignee: Asahi Glass Company, Ltd., Tokyo, Japan

[21] Appl. No.: 121,038

[22] Filed: Feb. 13, 1980

[30] Foreign Application Priority Data

Feb. 27, 1979 [JP] Japan .................................. 54-21347
Mar. 6, 1979 [JP] Japan .................................. 54-25149

[51] Int. Cl.³ .................... C25B 9/00; C25B 11/03; C25B 11/08; H01M 4/90
[52] U.S. Cl. .................................. 204/265; 204/284; 204/290 R; 204/292; 429/42; 252/425.3
[58] Field of Search ................. 204/98, 128, 256, 258, 204/265–266, 270, 277–278, 284, 290 R, 292, 294; 429/42; 252/425.3

[56] References Cited

U.S. PATENT DOCUMENTS

| 3,617,389 | 11/1971 | Kuhn et al. | 252/425.3 |
| 3,923,628 | 12/1975 | Gritzner | 204/265 X |
| 3,981,749 | 9/1976 | Fukuda et al. | 429/42 X |
| 4,035,254 | 7/1977 | Gritzner | 204/265 X |
| 4,150,076 | 4/1979 | Baris et al. | 429/42 X |
| 4,213,833 | 7/1980 | Lefevre | 204/258 X |

FOREIGN PATENT DOCUMENTS 472403 9/1975 U.S.S.R. ..................... 252/425.3

Primary Examiner—Donald R. Valentine
Attorney, Agent, or Firm—Oblon, Fisher, Spivak, McClelland & Maier

[57] ABSTRACT

A gas diffusion electrode is used as a cathode for an electrolysis of an alkali metal chloride or an electrode in a fuel cell etc. A gas diffusion electrode has a porous layer made of a sintered mixture of a filler, a catalyst and a hydrophobic material which is formed by decomposing a pore forming agent selected from the group consisting of nickel, cobalt or iron salts of a carboxylic acids which is incorporated in a mixture of said filler, said catalysts and said hydrophobic material.

17 Claims, 5 Drawing Figures

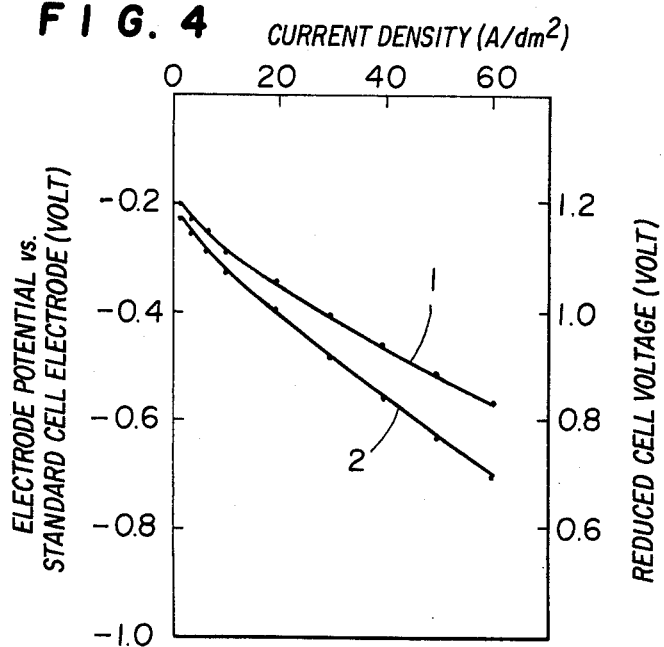
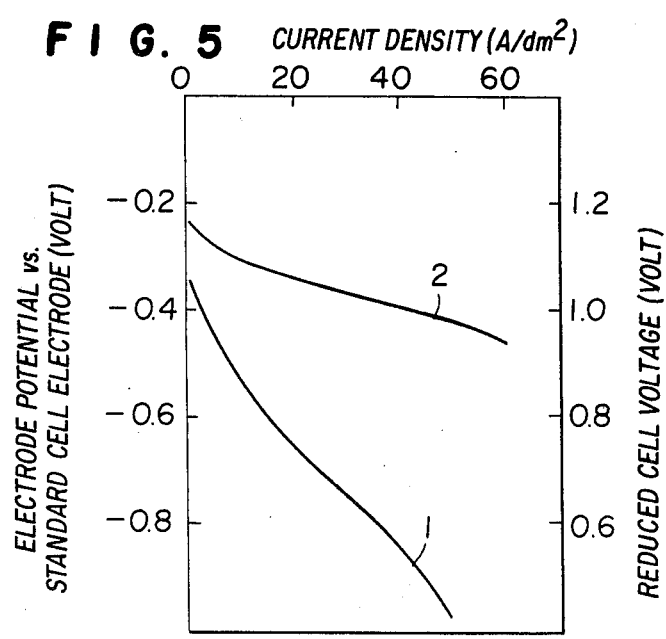

GAS DIFFUSION ELECTRODE

BACKGROUND OF THE INVENTION

1. Field of the Invention

The present invention relates to a novel gas diffusion electrode. More particularly, it relates to a novel gas diffusion electrode which is suitable as an oxygen reduction electrode for an electrolysis of an alkali metal chloride or an electrode in an oxidizer side of a fuel cell.

2. Description of the Prior Arts

Recently, it has been proposed to use a gas diffusion electrode as a cathode for an electrolysis of an aqueous solution of an alkali metal chloride for producing an alkali metal hydroxide and chlorine and to feed an oxygen containing gas to the gas diffusion electrode. This type of electrolysis is carried out at remarkably low decompostion voltage without a generation of hydrogen gas from the cathode by following cathodic reaction:

$$H_2O + \tfrac{1}{2}O_2 + 2e^- \rightarrow 2OH^-$$

(U.S. Pat. Nos. 3,923,628 and 4,035,254). The electrode used in the electrolysis is a gas diffusion electrode having three phase zone to contact a gas, a liquid and a solid in the electrode to perform an cathodic reaction. The conventional gas diffusion electrode comprises a current collector and a catalyst containing porous layer formed by sintering a mixture of a catalyst for accelerating said reaction, said porous layer composed of a carrier for carrying said catalyst and a hydrophobic material for preventing permeation of an electrode and having a function as a binder. Thus, the conventional gas diffusion electrode does not have satisfactory characteristics to give a large overvoltage and to be unsatisfactory reproducibility. Moreover, when the electrode is used for a long period, loss of water repellency, crackings on the surface of the electrode and loss of a catalytic activity arise which lead to unsatisfactory durability.

On the other hand, the same disadvantages are found on an electrode in an oxidizer side of a fuel cell using an oxygen-containing gas as an oxidizing reagent. That is, the reaction occuring at the electrode is not satisfactorily fast and the performance of the cell is poor.

The inventors have studied to overcome these disadvantages of the conventional gas diffusion electrodes and have found that a perforating agent used for a preparation of a gas diffusion electrode highly improve the charactertistics of an electrode and these disadvantages of the conventional gas diffusion electrodes can be overcome by using a specific material as the perforating agent.

SUMMARY OF THE INVENTION

It is an object of the present invention to provide a gas diffusion electrode which has high performance such as small overvoltage and excellent reproducibility and excellent durability without crackings nor a deterioration of catalytic activity.

The foregoing and other objects of the present invention have been attained by providing a gas diffusion electrode which has a porous layer prepared by sintering a mixture of a catalyst, a hydrophobic material, filler and pore forming agent of a nickel, cobalt or iron salt of an carboxylic acid.

BRIEF DESCRIPTION OF THE DRAWINGS

FIGS. 3, 4 and 5 are respectively graphs showing characteristics of gas diffusion electrodes of the present invention described in the examples.

DETAILED DESCRIPTION OF THE PREFERRED EMBODIMENTS

Figure 1:
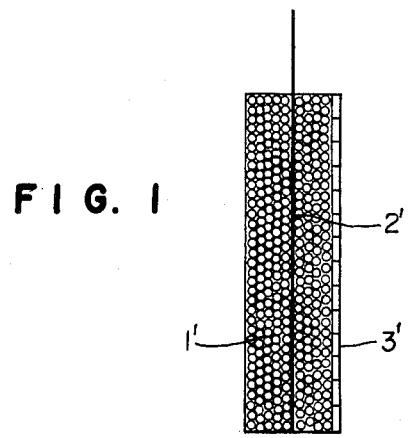
FIG. 1 is a schematic view of a gas diffusion electrode of the present invention.

In the conventional gas diffusion electrodes, it has been known to mainly use an inorganic salt such as sodium sulfate, sodium carbonate or ammonium carbonate as a pore forming agent.

The electrode of the present invention prepared by using a specific perforating agent has advantages of a decreasing of a cell voltage for about 1 volt in an electrolysis of an alkali metal chloride and a remarkable decrease of crackings and remarkable improvements of reproducibility and durability in comparison with the conventional gas diffusion electrodes.

The gas diffusion electrode of the present invention will be further described in detail.

The catalyst used for the electric conductive porous layer of the electrode of the present invention is a substance for accelerating the reaction:

$$H_2O + \tfrac{1}{2}O_2 + 2e \rightarrow 2OH^-$$

Suitable catalysts include noble metals such as platinum, palladium and silver; Raney silver; spinel compounds such as $CoFeAl_2O_5$; perovskite such as $LaNiO_3$ and cobalt phthalocyanine and mixtures thereof. The catalyst has a particle size of 0.01 to 300$\mu$ preferably 0.1 to 100$\mu$ and is used at an amount of 0.1 to 1,000 mg./cm$^2$ especially 0.5 to 100 mg./cm$^2$.

It is possible to use a thermally decomposable silver compound which is converted into metallic silver by a thermal decomposition in the sintering process. Such silver compounds include inorganic silver compounds such as silver carbonate; and silver salts of carboxylic acid such as silver citrate, silver acetate, silver oxalate, silver benzoate, and silver lactate. It is preferable to use platinum, palladium, silver or silver which is prepared by the thermal decomposition of silver carbonate, silver citrate and silver acetate as a catalyst because a rate of formation of hydroxyl ion at the electrode is fast and a durability of the electrode is high.

The filler used in the present invention has functions for shaping an electrode and maintaining the shape and/or carrying the catalyst. Suitable fillers include carbon black, activated carbon graphite or a metal such as nickel and iron in the form of powder or particle.

A catalyst can be supported on a filler or carrier before a molding step. The filler with or without a catalyst thereon is admixed with the pore forming agent and the other components of the present invention and the mixture is sintered to form a porous cathode containing the desired components. In the present invention, such feature is optimum.

The carrier powder preferably has a particle size in a range of 0.1 to 100$\mu$ and a specific surface area of 100 to 1500 m$^2$/g. The catalyst is preferably used at a ratio of 1 to 50 wt. % especially 5 to 30 wt. % based on the carrier.

The hydrophobic material imparts water repellency to prevent the permeation of an electrolyte and works as a binder for bonding particles of the catalyst and the carrier to the catalyst. Suitable hydrophobic materials can be polyethylene, polyvinyl chloride and preferably fluorinated polymers such as polytetrafluoroethylene and polyhexafluoropropylene, or paraffin. The hydrophobic material is preferably grains having a grain size of less than 500$\mu$ or a suspension or emulsion thereof in water or the other medium. It is preferable to use the hydrophobic material at an amount of 0.1 to 50 mg./cm$^2$ especially 1 to 30 mg./cm$^2$.

In the electrode of the present invention, the pore forming agent is the important factor. The carboxylic acids for preparing pore forming agents can be mono- or poly-carboxylic acid preferably $C_1$-$C_{10}$ mono-carboxylic acids. Typical perforating agents of the present invention include nickel salts of carboxylic acid such as nickel formate, nickel citrate, nickel stearate and nickel oxalate; cobalt salts of carboxylic acid such as cobalt formate, cobalt citrate, cobalt stearate and cobalt oxalate. One or more of the metal salts can be selected. It is optimum to use nickel formate and/or cobalt formate as the pore forming agent in the present invention since the pores having the optimum characteristics and uniformity can be easily formed. The amount of the pore forming agent depends upon kinds of the materials for pores being formed and kinds of the pore forming agent, and is preferably in a range of 5 to 60 wt. % based on the total amounts of the filler, the catalyst and the hydrophobic material.

When the amount of the perforating agent is less than the minimum, the desired perforating effect is not expected whereas when it is more than the maximum, pores having desired characteristics are not formed to form nonuniform pores too much and the cathode characteristics are too poor.

When it is in a range of 10 to 50 wt. %, it is optimum to obtain an electrode having the optimum characteristics.

The porous electrode can be prepared as follows. For example, when carbon powder is used as the filler, an aqueous solution of a water soluble salt of a noble metal such as chlorides, nitrates and sulfates as a catalyst is prepared and then, after evaporating water, carbon powder is added to the aqueous solution and the mixture is stirred to carry the noble metal salt on carbon powder and then, the product is reduced by a reducing agent such as hydrazine or sodium boron hydride or is thermally decomposed to convert the noble metal salt into the noble metal. Then, the hydrophobic material, the perforating agent and water or an alcohol as a medium are admixed and kneaded and molded to a desired thickness by a rolling method etc.

The platy product is press-bonded to an electric conductive substarate such as nickel mesh and sintered in an inert gas atmosphere such as argon and nitrogen at 280° to 380° C. for 10 to 90 minutes to prepare a porous cathode.

It is also possible to prepare an electrode by mixing the carbon powder, the catalytic material, the pore forming agent and the hydrophobic material and reducing and sintering the mixture in an inert gas or a reducing atmosphere.

The resulting porous electrode preferably has an air permeable coefficient of about $10^{-5}$ to $10^{-1}$ mole/cm$^2$.cmHg.min. so as to attain the purpose for diffusing an oxygen containing gas into the porous structure of the cathode easily. It is especially preferable for the cathode to have the characteristics such as an average pore size of 0.05 to 20$\mu$; a porosity of 30 to 70% and an air permeable coefficient of $10^{-4}$ to $10^{-1}$ mole/cm$^2$.cmHg.min., because a leakage of an electrolyte is prevented and a satisfactory specific surface area is given and a satisfactory gas diffusion can be attained.

When a gas diffusion electrode is formed by the conductive porous layer, it is possible to attach said hydrophobic material preferably a fluorinated polymer film on a gas feeding side of the porous layer by a press-bonding etc. so as to completely prevent a leakage of an electrolyte to the gas feeding side.

In accordance with the present invention, a satisfactory internal surface area is given and a satisfactory gas diffusion rate is attained and a leakage of an electrolyte can be completely prevented. When the porous electrode is used as an oxygen reducing cathode for an electrolysis of an alkali metal chloride or an electrode of an oxidant side in electric cell, excellent characteristics can be obtained.

A process for producing an alkali metal hydroxide by an electrolysis of an aqueous solution of an alkali metal chloride with the porous electrode of the present invention will be described referring to FIGS. 1 and 2.

In FIG. 1, a porous layer containing catalyst is shown as (1') and a current collector is shown as (2'). Preferably porous polymer film (3') is provided on a gas feeding side to prevent a leakage of an electrolyte.

Figure 2:
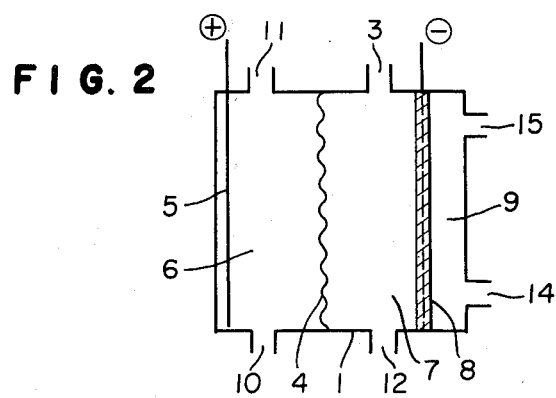
FIG. 2 is a schematic view of an electrolytic cell for an alkali metal chloride which is constructed by using the electrode of the present invetion.

In FIG. 2, an electrolytic cell (1) is divided by a cation exchange membrane (4) into an anode compartment (6) having an anode (8) and a cathode compartment (7). In the cathode compartment, an oxygen containing gas (air) chamber (9) is formed by a cathode (5) prepared by the process of the present invention. The reference numeral (10) designates an inlet for an aqueous solution of an alkali metal chloride such as sodium chloride as an electrolyte; (11) designates an outlet for the aqueous solution; (12) designates an inlet for water into the cathode compartment; (3) designates an outlet for an aqueous solution of an alkali metal hydroxide; (14) and (15) respectively designate inlet and outlet for an oxygen-containing gas.

The anode used in this system can be a metallic anode having dimensional stability prepared by coating an oxide of ruthemium or rhodium etc. on a substrate made of valve metal such as titanium or tantalum etc. or a graphite electrode. It is preferable to use the metallc anode because an electrolytic voltage can be lower than those of the other anodes.

The partitioning membrane is made of a polymer having cation exchange groups such as carboxylic acid group, sulfonic acid group, phosphonic acid group or phenolic hydroxyl group. It is especially preferable to use a fluorinated polymer. The fluorinated polymer having ion exchange groups are preferably copolymers of a perfluorovinyl monomer such as tetrafluoroethylene and chlorotrifluoroethylene with a vinyl monomer having an ion exchange group such as sulfonic acid group, carboxylic acid group and phosphoric acid group or a functional group which can be converted into an ion exchange group. It is also possible to use a membrane prepared by introducing an ion exchange groups such as sulfonic acid groups into a membrane of a polymer of trifluorostyrene or a polymer of styrenedivinylbenzene.

When monomers for forming the following units (a) or (b) are used for the preparation of the membrane, an alkali metal hydroxide having high purity can be obtained at relatively high current efficiency. Therefore, it is preferable to use a monomer for forming the following units:

and

wherein X represents fluorine, chlorine, hydrogen or $-CF_3$; X' represents X or $CF_3(CF_2)_m$; m represents 1 to 5; and Y represents

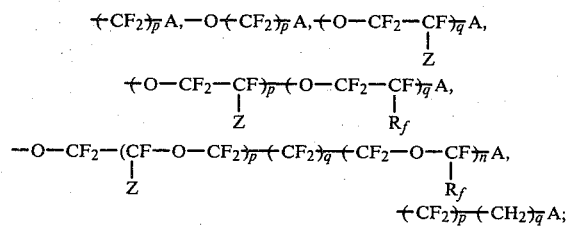

p, q and n respectively represent 1 to 10; Z and $R_f$ respectively represent $-F$ or a $C_1-C_{10}$ perfluoroalkyl group; A represents carboxylic acid type group, $-COOM$, or a functional group which can be converted to carboxylic type group in a hydrolysis or a neutralization such as $-CN$, $-COF$, $-COOR_1$, $-CONR_2R_3$ and $-COONR_4$; $R_1$ represents a $C_1-C_{10}$ alkyl group; M represents hydrogen or an alkali metal atom and $R_2$, $R_3$ and $R_4$ respectively represents hydrogen or a $C_1-C_{10}$ alkyl group.

In the case of the copolymer having the units of (a) and (b), the ratio of the units (b) is selected to be 1 to 40 mole % preferably 3 to 20 mole % so as to give the units (b) in the copolymer for providing a desired ion exchange capacity.

The thickness of the ion exchange membrane is usually in a range of about 20 to 600μ preferably about 50 to 400μ.

The alkali metal chloride used for the electrolysis is usually sodium chloride and can be also the other chlorides such as potassium chloride and lithium chloride.

The process for producing an alkali metal hydroxide by an electrolysis of an aqueous solution of an alkali metal chloride can be the conventional processes described in U.S. Pat. Nos. 3,923,628 and 4,035,254 wherein a gas diffusion is used. For example, the electrolysis is carried out at a cell voltage of 1.8 to 5.5 volt and a current density of 5 to 100 A/dm² with an aqueous solution of an alkali metal chloride. The anode used in the electrolysis can be graphite or an anticorrosive electrode having dimensional stability which is made of a titanium substrate coated with a platinum group metal or an oxide of a platinum group metal. The electrolytic cell system can be unipolar or multipolar type.

In the case of two compartment type electrolytic cell prepared by partitioning an anode and a cathode with the cation exchange membrane to form an anode compartment and a cathode compartment and feeding an aqueous solution of an alkali metal chloride into the anode compartment and electrolyzing it to obtain an aqueous solution of an alkali metal hydroxide from the cathode compartment, it is possible to produce sodium hydroxide having high or low concentration of 20 to 50% at high current efficiency of higher than 85% by electrolyzing an aqueous solution of sodium chloride at a current density of 5 to 50 A/dm² and a cell voltage of 1.8 to 3.7 V.

A further understanding can be obtained by reference to certain specific examples which are provided herein for purposes of illustration only and are not intended to be limited.

Figure 3:
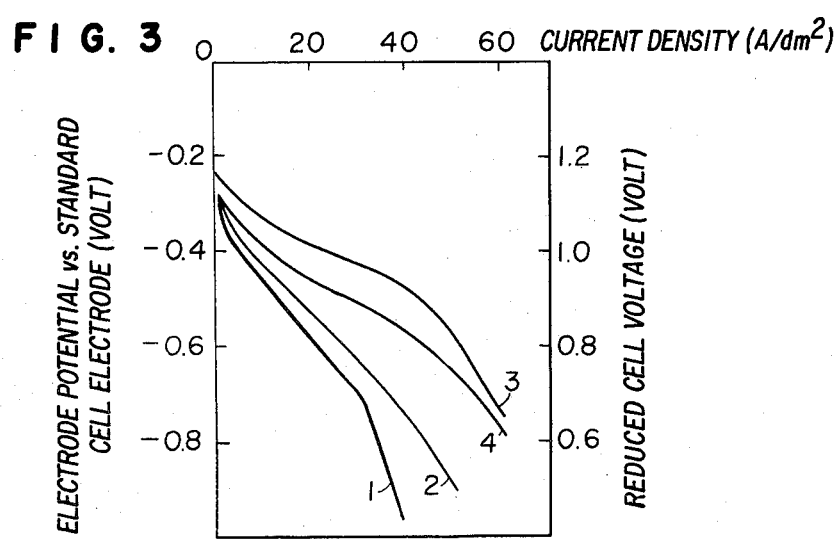

In Examples 1, 3 and 4, the data are shown in FIGS. 3, 4 and 5 wherein the electrode potentials vs. the standard cell electrode (volt) are plotted on each left ordinate and the reduced cell voltages as the differences of cell voltages compared with those of the conventional iron cathode cases at a current density of 20 A/dm² are plotted on each right ordinate.

EXAMPLE 1

Carbon black carrying 26 wt. % of silver, an aqueous dispersion containing 60 wt. % of polytetrafluoroethylene having a particle diameter of less than 1μ and nickel formate as a perforating agent were blended and kneaded at ratios of silver-carbon black; polytetrafluoroethylene; nickel formate of 1:1.2:1 to 2.5 by weight. Each mixture was coated on both surfaces of Ni mesh having 40 mesh to give the silver content of 5 mg./cm². Each coated product was treated by a roll-molding apparatus to give a thickness of 1 mm. Each product was heated at 350° C. for 60 minutes in nitrogen gas atmosphere to sinter polytetrafluoroethylene so as to increase water repellency and binding property and also to thermally decompose nickel formate whereby an electrode having a catalyst layer with suitable porous structure was obtained.

An electrolytic cell shown in FIG. 2 was constructed by using the resulting electrode as a cathode, ruthenium oxide coated on a metallic titanium as anode and a cation exchange membrane prepared by hydrolyzing a membrane made of a copolymer of $C_2F_4$ and $CF_2=CFO(CF_2)_3COOCH_3$ (thickness of 300μ; ion exchange capacity of 1.48 meq./g.) as a partitioning membrane.

An electrolysis of aqueous solution of sodium chloride was carried out 25 wt. % of aqueous solution of sodium chloride into the anode compartment and air into a gas chamber at a rate of 1 liter/minute at a current density of 10 A/dm², under controlling feeding rates of the aqueous solution of sodium chloride and water so as to maintain a concentration of sodium hydroxide at 30 wt. % in the cathode compartment.

FIG. 3 shows characteristics of electrodes (9) prepared by varying a content of nickel formate wherein the reference numerals 1, 2, 3 and 4 respectively designate cases having ratios of nickel formate to Ag-carbon black of 0, 1, 2 and 2.5 by weight.

EXAMPLE 2

In accordance with the process of Example 1 except using nickel oxalate, iron oxalate, nickel acetate, cobalt formate or cobalt oxalate at each ratio shown in Table 1 as a perforating agent instead of nickel formate, each electrode was prepared and characteristics of each electrode were measured. The results are shown in Table 1.

TABLE 1

| Perforating agent | Ag on carbon black perforating agent (weight ratio) | Electrode potential (20 A/dm$^2$) (V) |
|---|---|---|
| nickel oxalate | 1 | −0.393 |
| iron oxalate | 1/0.6 | −0.397 |
| nickel acetate | 1/0.8 | −0.401 |
| cobalt formate | 1 | −0.403 |
| cobalt oxalate | 1/2.5 | −0.417 |

EXAMPLE 3

In accordance with the process of Example 1 except using carbon black carrying palladium (Pd on carbon black) instead of Ag on carbon black, an electrode was prepared and characteristics of the electrode were measured.

The result is shown in FIG. 4 as well as the result of the test using oxygen as the feed gas. In FIG. 4, the reference numeral 1 designates the result obtained by using oxygen and 2 designates the result obtained by using air.

EXAMPLE 4

In accordance with the process of Example 1 except that the coated product was molded by a press-molding method under a pressure of 50 kg./cm$^2$ instead of the roll-molding method, an electrode was prepared and characteristics of the electrode were measured. The results are shown in FIG. 5 wherein the reference numeral 1 designates the case that the ratio of nickel formate is 0, and 2 designates the case that the ratio of nickel formate to Ag on carbon black of 2 by weight.

EXAMPLE 5

Silver carbonate as a thermally decomposable silver compound, powdery active carbon having a particle diameter of less than 44μ and an aqueous dispersion containing 60 wt. % of polytetrafluoroethylene haing a particle diameter of less than 1μ and cobalt formate having a particle diameter of less than 44μ as a perforating agent were blended and kneaded at ratios of silver carbonate:active carbon:polytetrafluoroethylene:cobalt formate of 1:1:0.8:1.0 to 1.5 by weight. The mixture was molded by a rolling to obtain a molded plate having 400μ thickness. The molded plate was pressed and bonded to a nickel mesh having 40 mesh by a press-molding machine under a pressure of 1000 kg./cm$^2$. The product was heated at 350° C. for 60 minutes in nitrogen atmosphere to sinter polytetrafluoroethylene so as to increase the water repellency and the binding property and also to thermally decompose silver carbonate and cobalt formate whereby an electrode having an average pore diameter of 0.5μ, a porosity of 54% and an air permeable coefficient of 1.4×10$^{-3}$ mole/cm$^2$.cmHg.-min. was obtained. The electrode had a content of silver of 10 mg./cm$^2$.

An electrolytic cell shown in FIG. 2 was prepared by using the resulting electrode as a cathode, ruthenium oxide coated on a metallic titanium as anode and a cation exchange membrane prepared by hydrolyzing a membrane made of a copolymer of C$_2$F$_4$ and CF$_2$=CFO (CF$_2$)$_3$COOCH$_3$ (thickness of 300μ; ion exchange capacity of 1.48 meq./g.) as a partitioning membrane.

An electrolysis of sodium chloride was carried out feeding 25 wt. % of aqueous solution of sodium chloride into the anode comparatment, air into a gas chamber at a rate of 1 liter/minute at a current density of 10 A/dm$^2$ under controlling feeding rates of the aqueous solution of sodium chloride and water so as to maintain a concentration of sodium hydroxide at 30 wt. % in the cathode compartment. As a result, a cell voltage was 2.05 V and an increase in the cell voltage after the electrolysis for 3000 hours was 0.09 V.

EXAMPLE 6

In accordance with the process of Example 5 except blending and kneading silver carbonate (as Ag), active carbon, polytetrafluoroethylene and nickel formate at ratios of 3:1:0.8:1 by weight; an electrode having a silver content of 30 mg./cm$^2$ was prepared and was used for the electrolysis in the same condition. As a result, a cell voltage was 2.06 V and an increase in the cell voltage after the electrolysis for 3000 hours was 0.07 V.

EXAMPLE 7

In accordance with the process of Example 5 except blending and kneading active carbon carrying 20 wt. % of palladium, polytetrafluoroethylene and nickel formate at ratios of 1:0.8:1 by weight, an electrode having a palladium of 2 mg./cm$^2$ was prepared. An electrolysis of potassium chloride was carried out feeding 3.5 N of aqueous solution of potassium chloride into the anode compartment and air into the gas chamber at a rate of 1 liter/minute at a current density of 10 A/dm$^2$ under controlling feeding rates of the aqueous solution of potassium choirde and water so as to maintain a concentration of potassium hydroxide of 35 wt. % in the cathode compartment. As a result, a cell voltage was 2.00 V and an increase in the cell voltage after the electrolysis for 3000 hours was 0.05 V.

EXAMPLE 8

In accordance with the process of Example 5 except blending and kneading silver oxide, active carbon, polytetrafluoroethylene and nickel citrate at ratios of 4:1:0.8:1 by weight, an electrode having a silver content of 50 mg./cm$^2$ was prepared and was used for the electrolysis in the same condition. As a result, a cell voltage was 2.08 V.

EXAMPLE 9

In accordance with the process of Example 5 except blending and kneading fine silver powder having a particle diameter of less than 0.1μ, active carbon, polytetrafluoroethylene and cobalt formate at ratios of 2.5:1:0.8:1.5 by weight, an electrode having a silver content of 30 mg./cm$^2$ was prepared and was used for the electrolysis in the same condition. As a result, a cell voltage was 2.07 V.

EXAMPLE 10

In accordance with the process of Example 5 except blending and kneading carbon black carrying 26 wt.% of silver, polytetrafluoroethylene and nickel oxalate at ratios of 1:1.2:2 by weight, an electrode was prepared and used for the electrolysis in the same condition. As a result, a cell voltage was 2.06 V.

EXAMPLE 11

In accordance with the process of Example 5 except blending and kneading silver carbonate, active carbon, polytetrafluoroethylene, nickel formate and cobalt formate at ratios of 1:1:0.8:0.5:0.5 by weight, an electrode was prepared and used for the electrolysis in the same condition. As a result, a cell voltage was 2.08 V.

EXAMPLE 12

Active carbon powder and silver citrate were mixed at a ratio of 1:0.8 by weight. An aqueous dispersion containing 60 wt.% of polytetrafluoroethylene having a particle diameter of less than 1μ, was added to give ratios of active carbon:silver:polytetrafluoroethylene of 1:0.8:0.8 by weight. The mixture was kneaded and molded by a rolling to obtain a molded plate having a desired thickness. The molded plate was pressed and bonded to a nickel mesh having 40 mesh by a press-molding machine under a pressure of 1000 kg./cm$^2$. The product was heated at 350° C. for 60 minutes in nitrogen atmosphere to sinter polytetrafluoroethylene so as to increase the water repellency and the binding property and also to thermally decompose silver citrate, whereby an electrode having an average pore diameter of 0.9μ, a porosity of 56% and an air permeable coefficient of $1.0 \times 10^{-3}$ mole/cm$^2$.cmHg.min. was obtained. The electrode had a content of silver of 10 mg./cm$^2$.

In accordance with the process of Example 5 except using the resulting electrode as the cathode, the electrolysis of sodium chloride was carried out. As a result, a cell voltage was 2.03 V and an increase in the cell voltage after the electrolysis for 3000 hours was 0.09 V.

EXAMPLE 13

In accordance with the process of Example 12 except varying the content of silver citrate so as to give a content of silver of 30 mg./cm$^2$, the electrode was prepared and was used for the electrolysis in the same condition. As a result, a cell voltage was 2.04 V and an increase in the cell voltage after the electrolysis for 3000 hours was 0.06 V.

EXAMPLE 14

In accordance with the process of Example 12 except blending and kneading active carbon, silver acetate (as Ag) and polytetrafluoroethylene at ratios of 1:0.8:0.8 by weight; an electrode having a silver content of 10 mg./cm$^2$ was prepared and was used for the electrolysis in the same condition. As a result, a cell voltage was 2.07 V and an increase in the cell voltage after the electrolysis for 3000 hours was 0.08 V.

EXAMPLE 15

In accordance with the process of Example 12 except blending and kneading active carbon, silver acetate (as Ag) and polytetrafluoroethylene at ratios of 1:4:0.8 by weight, an electrode having a silver content of 50 mg./cm$^2$ was prepared and was used for the electrolysis of an aqueous solution of potassium chloride as in Example 7. As a result, a cell voltage was 2.07 V and an increase in the cell voltage after the electrolysis for 3000 hours was 0.05 V.

EXAMPLE 16

In accordance with the process of Example 12 except blending and kneading active carbon, silver oxalate (as Ag) and polytetrafluoroethylene at ratios of 1:5.5:0.8 by weight, an electrode having a silver content of 70 mg./cm$^2$ was prepared and was used for the electrolysis of an aqueous solution of sodium chloride in the same condition. The results are shown in the following table. As a reference, the results of the electrolysis using the conventional iron cathode are also shown in the table.

| Current density (A/dm$^2$) | Cell voltage in case of cathode of this invention (V) | Cell voltage in case of conventional iron cathode (V) |
| --- | --- | --- |
| 10 | 2.00 | 3.00 |
| 20 | 2.35 | 3.30 |
| 30 | 2.89 | 3.70 |

EXAMPLE 17

In accordance with the process of Example 12 except blending and kneading active carbon, silver benzoate (as Ag) and polytetrafluoroethylene at ratios of 1:3.3:0.8 by weight, an electrode having a silver content of 40 mg./cm$^2$ was prepared and was used for the electrolysis of an aqueous solution of sodium chloride in the same condition. The results are shown in the following table.

| Current density (A/dm$^2$) | Cell voltage (V) |
| --- | --- |
| 10 | 2.03 |
| 20 | 2.36 |
| 30 | 2.86 |

We claim:
1. A gas diffusion electrode having a conductive porous layer in contact with a conductive current collector, said porous layer being made by sintering a shaped mixture of a filler, a catalyst, a hydrophobic bonding material and at least one perforating agent selected from the group consisting of nickel, cobalt and iron salts of a carboxylic acid, the sintering of the mixture being carried out to decompose the perforating agent and to produce a porous bonded layer permeable to gas and repellant to water.

2. A gas diffusion electrode according to claim 1 which has an average pore size of 0.01 to 30μ, a porosity of 20 to 80% and an air permeable coefficient of $10^{-5}$ to $10^{31\ 1}$ mole/cm$^2$.cmHG.min.

3. A gas diffusion electrode according to claim 2 wherein the content of said perforating agent is in a range of 5 to 60 wt.% based on a mixture.

4. A gas diffusion electrode according to claim 3 wherein said perforating agent is a nickel or cobalt salt of formic acid, citric acid, stearic acid or oxalic acid.

5. A gas diffusion electrode according to claim 1 wherein said filler is an electric conductive powder and said catalyst is a noble metal and said hydrophobic material is a fluorinated polymer.

6. A gas diffusion electrode according to claim 5 wherein said electric conductive powder is carbon or nickel powder.

7. A gas diffusion electrode according to claim 5 wherein said catalyst is silver, a platinum group metal, Raney silver, a spinel compound, perovskite or a metal phthalocyanine.

8. A gas diffusion electrode according to claim 7 wherein said catalyst is silver obtained by thermal decomposition of a thermally decomposable silver compound during the sintering.

9. A gas diffusion electrode according to claim 8 wherein said thermally decomposable silver compound is a silver salt of carboxylic acid.

10. A gas diffusion electrode according to claim 9 wherein said silver salt of carboxylic acid is silver citrate, silver acetate, silver oxalate, silver benzoate or silver lactate.

11. A gas diffusion electrode according to claim 1 wherein the content of said perforating agent is in a range of 5 to 60 wt.% based on a mixture.

12. A gas diffusion electrode according to claim 11 wherein said perforating agent is a nickel or cobalt salt of formic acid, citric acid, stearic acid or oxalic acid.

13. A gas diffusion electrode according to claim 1 wherein said catalyst is silver obtained by thermal decomposition of a thermally decomposable silver compound in the sintering.

14. A gas diffusion electrode according to claim 13 wherein said thermally decomposable silver compound is a silver salt of carboxylic acid.

15. A gas diffusion electrode according to claim 14 wherein said silver salt of carboxylic acid is silver citrate, silver acetate, silver oxalate, silver benzoate or silver lactate.

16. An electrolytic cell for electrolysis of an alkali metal chloride to produce an alkali metal hydroxide in a cathode compartment and to produce chlorine in an anode compartment, the two compartments being separated by a membrane, in which the cathode is a gas diffusion electrode into which oxygen containing gas may be diffused, the gas diffusion electrode being an electrode according to claim 1, 2, 3, 4, 5, 6, 7, 8, 9, 10, 11, 12, 13, 14, or 15.

17. A fuel cell having a gas diffusion electrode on its oxidizer side, the gas diffusion electrode being an electrode according to claim 1, 2, 3, 4, 5, 6, 7, 8, 9, 10, 11, 12, 13, 14, or 15.

* * * * *